Nov. 6, 1956  D. KUHLENSCHMIDT ET AL  2,769,320
DAMPER CONTROL MECHANISM FOR AIR CONDITIONING APPARATUS
Filed March 30, 1954  5 Sheets-Sheet 1

VENTILATION CYCLE

Inventors:
Donald Kuhlenschmidt
Curtis O. Fowler
Paul O. Pippel
Atty.

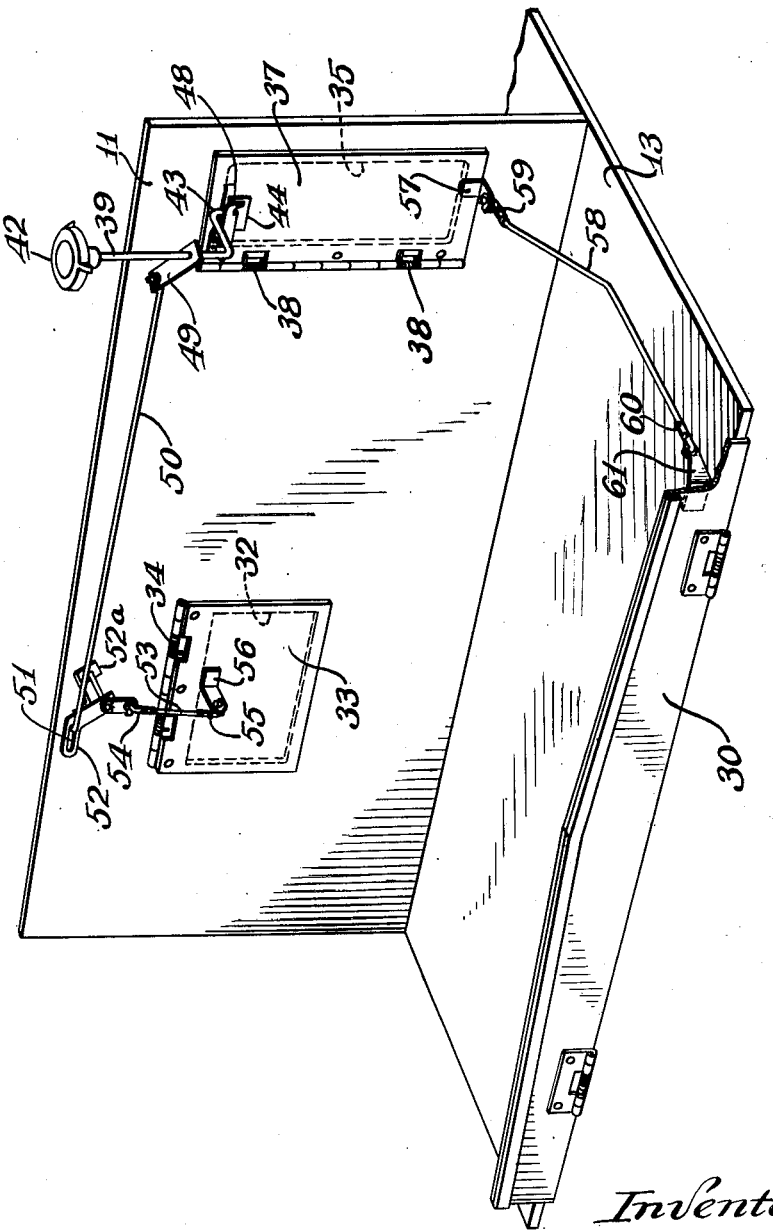

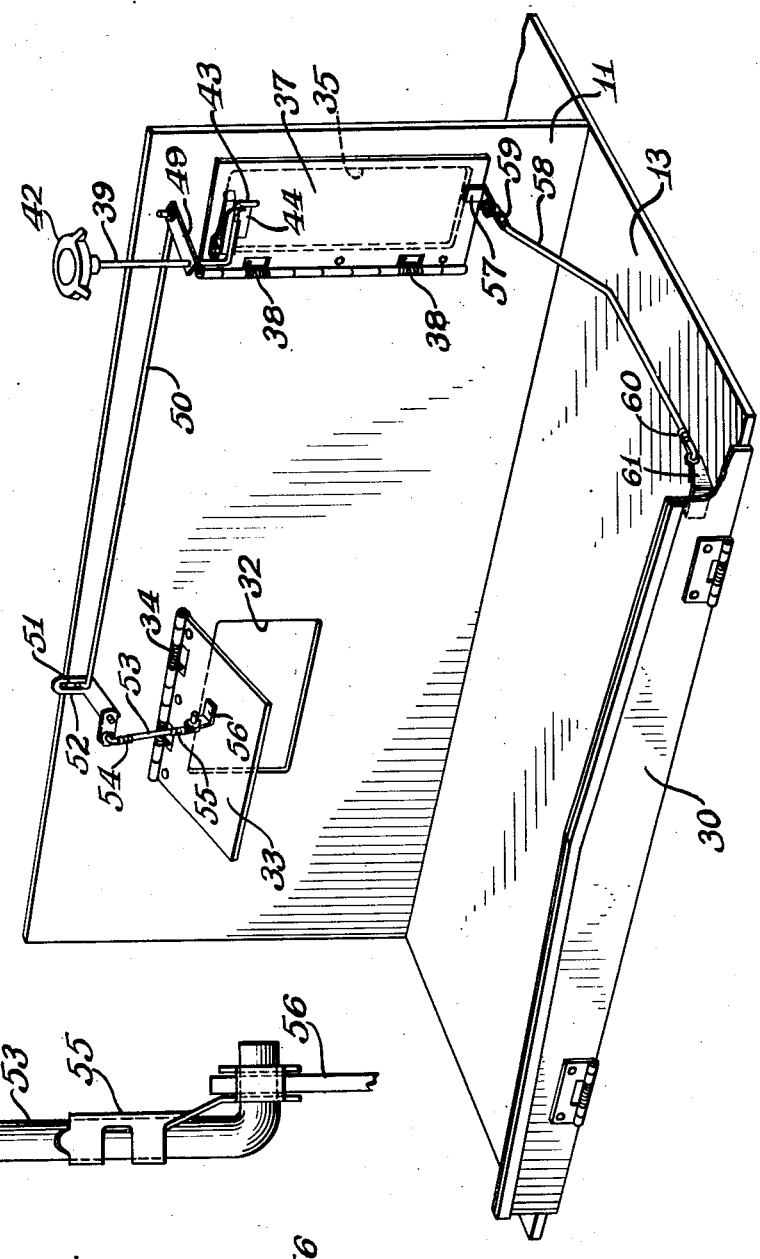

Nov. 6, 1956  D. KUHLENSCHMIDT ET AL  2,769,320
DAMPER CONTROL MECHANISM FOR AIR CONDITIONING APPARATUS
Filed March 30, 1954                           5 Sheets-Sheet 4
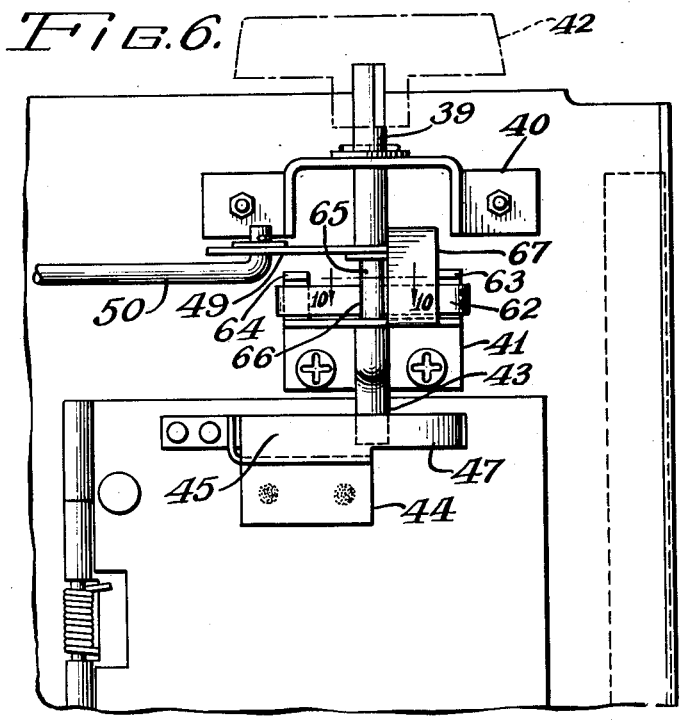
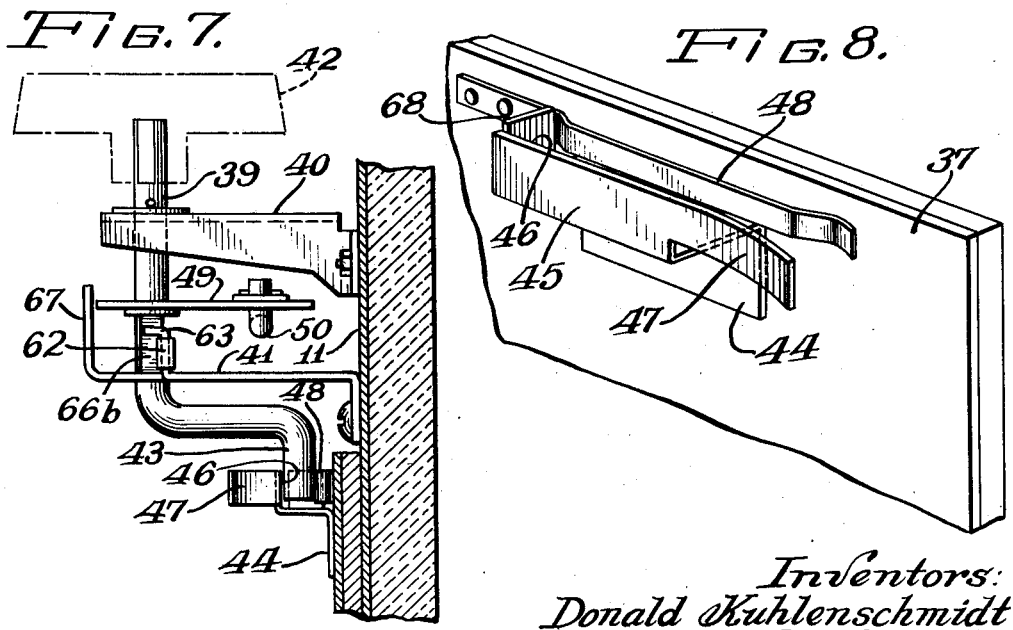
Inventors:
Donald Kuhlenschmidt
Curtis O. Fowler
Paul O. Pepple Atty.

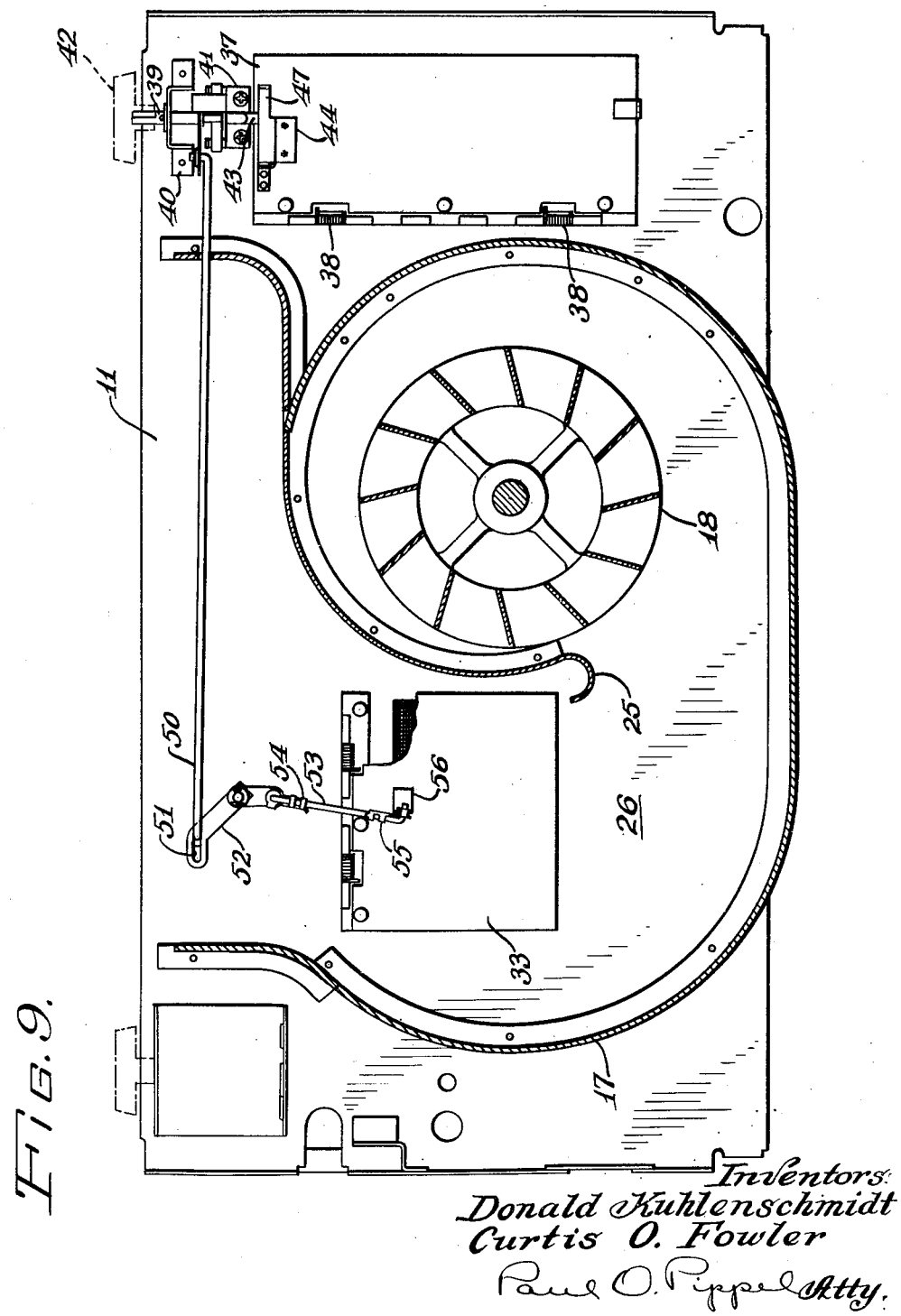

United States Patent Office 2,769,320
Patented Nov. 6, 1956

2,769,320

DAMPER CONTROL MECHANISM FOR AIR CONDITIONING APPARATUS

Donald Kuhlenschmidt, Newburgh, and Curtis O. Fowler, Spurgeon, Ind., assignors, by mesne assignments, to Whirlpool-Seeger Corporation, a corporation of Delaware Application March 30, 1954, Serial No. 419,862

6 Claims. (Cl. 62—129)

This invention relates to air conditioning units of the type usually mounted in the window of a room to be cooled, but more particularly it is concerned with the air flow control means associated with units of this character.

It is usually customary in units of this type to provide a system of dampers covering openings therein for selectively regulating or controlling, recirculation of air through the unit from the room, intake of fresh make-up air from the outside atmosphere and exhaustion or evacuation of stale air to the outside. Likewise it is generally customary to manually operate these dampers by means of a mechanism involving a plurality of control elements which, in some instances, are interlocked and coordinated one with the other, while in others they are individually operated as desired. Such arrangements are complicated and costly to fabricate and maintain, and, usually, unless operated by highly qualified or skilled individuals, or users thoroughly familiar with the mechanisms, do not produce the most satisfactory air flow control results for units of this character.

It is a primary object of this invention, therefore, to provide an air conditioning unit having greatly simplified and improved air flow control means therein.

Another object is to provide a coordinated control mechanism operable from a single control element for regulating air flow through an air conditioning unit.

A further object is to provide an air conditioning unit having a plurality of dampers therein that are operable from a common manually actuated control element for regulating air flow through the unit.

A still further object is to provide an air conditioning unit wherein the means for admitting fresh air, for exhausting stale air, and for regulating recirculation of room air through the unit are operable from a common control element.

A yet still further object is to provide an air conditioning unit wherein a damper for controlling the exhaustion of stale air is connected by lost-motion linkage to a rotatable control element that is additionally engageable in actuating relationship with a damper for controlling the flow of fresh air into the unit.

Another object is to provide air flow control assemblies for an air conditioning unit wherein the assemblies include an exhaust damper and a fresh air damper selectively controlled by a common control element, and an air recirculation control damper operatively connected to the fresh air damper for conjoint operation therewith.

The foregoing and other objects and features of the invention will become apparent as the disclosure is more fully made in the following detailed description of a preferred embodiment of the invention as illustrated in the accompanying sheets of drawings in which:

Fig. 2 is a skeletonized perspective of the air flow control mechanism of the present invention with said mechanism being shown in position for recirculating room air through the unit and back into the room being cooled.

Fig. 3 is a similar to Fig. 2 but showing the air flow control mechanism in position for exhausting stale air from the room being cooled.

Figs. 4 and 5 show enlarged details of the clevis clip fastener used for loosely but fixedly positioning ends of the various control rods.

Fig. 6 is a front elevational view, shown in enlarged detail, of the common control rod mechanism and the mounting brackets therefor.

Fig. 7 is a side elevational view of the control rod mechanism as shown in Fig. 6.

Fig. 8 is a perspective view, shown in enlarged detail, of the clip bracket mounted on the fresh-air damper and adapted for receiving the control rod crank.

Fig. 9 is a sectional view taken on the line 9—9 of Fig. 1.

Fig. 10 is a sectional view of a portion of the control rod taken on line 10—10 of Fig. 6.

Figure 1:
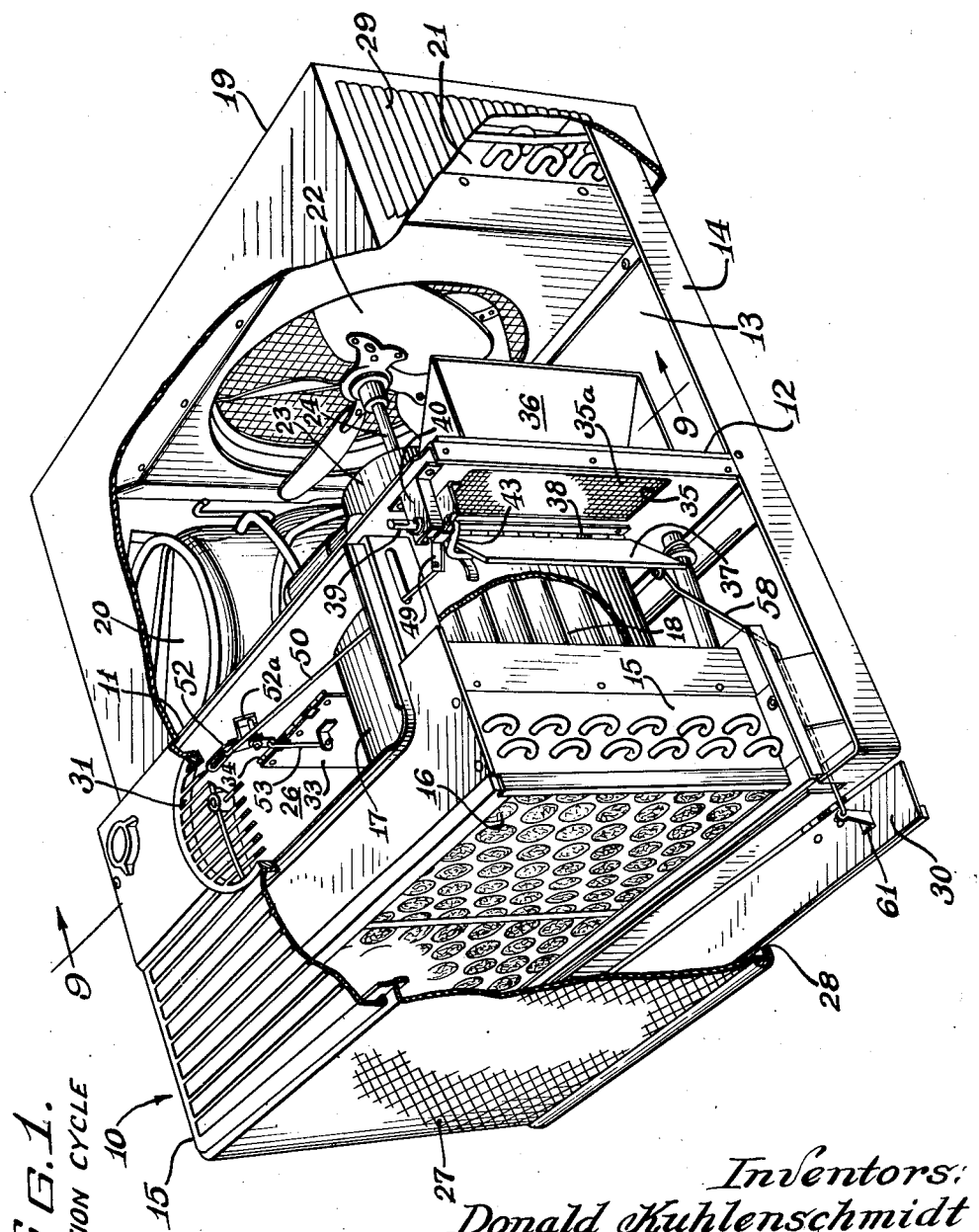
Fig. 1 is a perspective view, partially cut away to better show the components thereof, of a window mounted type air conditioning unit employing the present invention and showing the air flow control mechanism thereof in position for directing fresh air, admitted from the outside atmosphere, into the air stream of the room being cooled.

For purposes of illustration there is depicted in the drawings herein one preferred embodiment which shows the present invention as incorporated in a self-contained air conditioning unit of the type generally adapted for mounting in the window of a room to be cooled. It will be appreciated however, by those skilled in the art, that the present invention is not limited to the construction illustrated but is likewise readily applicable to other types of air conditioning units without deviating from the inventive concepts hereof.

In the particular embodiment selected for illustration the air conditioning unit, represented generally by the reference character 10, includes an inner cabinet or cooling compartment portion that extends into the room, and an outer cabinet or apparatus compartment portion that extends into the outside atmosphere. A wall member 11 having a layer of heat insulating material 12 thereon is positioned to serve as a dividing or common wall between the two portions of the unit which portions, in turn, are mounted on a supporting base or frame 13 fashioned with upwardly flanged marginal edges 14.

The inner cabinet or cooling compartment portion of the unit is formed by an opened bottom housing or casing 15 removably positioned over that inwardly projecting portion of base 13 which carries a portion of the cooling apparatus components including a shrouded evaporator 15, an air filter element 16, a blower fan shroud or scroll housing 17 and a blower fan 18. The outer cabinet or apparatus compartment portion of the unit is formed by an opened ended casing or housing 19 positionable around that outwardly projecting portion of base 13 which carries a motor-compressor 20, a shrouded condenser 21, a condenser fan 22 and a fan motor 23. Said latter housing or casing may additionally serve as a mounting structure for fixedly positioning said unit in a window frame.

The fan motor 23, which preferably is provided with a double-ended shaft 24, also drives the blower evaporator fan 18 mounted within the scroll-like housing 17. Said scroll housing being conventional in form is provided with an axial opening (not shown) that adjoins and opens into the shrouded evaporator 15, and a peripheral outlet or opening 25 that opens into a discharge chamber or compartment 26 formed within and extending to the top of said inner cabinet portion.

The base or supporting frame 13 is dimensioned so that the inner flanged edge 14 thereof will be spaced from the front wall 27, of the inner cabinet housing 15, and thereby provide an elongated opening 28 for admitting air from the room into the unit after said housing has been placed in position over said base.

As is well understood the evaporator, compressor, and condenser units are interconnected with refrigerant carrying conduits, which for drawing simplification purposes have not been shown, and the system is filled with suitable refrigerant in accordance with standard practices in the industry.

Louvered openings 29 in the side wall of the outer cabinet housing admit outside air which is circulated therearound by the fan 22 then discharged through the condenser 21 back into the atmosphere by way of an opening (not shown) in the rear wall of said outer cabinet housing. Room air passes into the inner cabinet by way of the elongated opening 28, which may be covered by the hingedly mounted damper 30, and thereafter through the filter element 16 and into heat exchange relation with the evaporator 15, thence through the blower 18 and into the chamber 26 after which it is discharged back into the room by way of a pair of louvered openings 31, only one of which is shown, in the top of said inner cabinet housing.

In order to regulate the flow of air through the unit and to exhaust stale air as well as admit fresh air there are provided therein a plurality of air passages or openings which may be covered by damper means selectively operable for purposes of restricting the passage of air through any of such openings as may be required to obtain the particular regulation or control desired. An opening 32 (Fig. 3) in the dividing wall 11 adjoining the discharge chamber 26 provides a passageway through which stale air may be removed or exhausted from the room and passed into the outer cabinet from whence it may be subsequently discharged to the outside atmosphere. The opening 32 is covered with a damper or panel-like closure member 33 hingedly mounted on said dividing wall by suitable horizontally disposed spring-biased hinges 34 which are biased to maintain said damper normally closed. A second opening 35, in said dividing wall and having a wire screen 35a thereover, adjoins an angularly formed vestibule-like passageway or compartment 36 that, in turn, opens into the outside atmosphere through one side wall of the outer housing 19 and thus provides inlet means for admitting fresh or makeup air into the inner cabinet 15. A damper or panel-like closure member 37, hingedly mounted by suitable vertically disposed spring-biased hinges 38 on said dividing wall, is positionable for partially or completely restricting the opening 35 in said dividing wall and the hinges 38 are biased to maintain this damper normally closed.

In the present invention the dampers 30, 33, and 37 are interconnected and arranged for selective operation as a result of motivation by a common control element. A control element, in the form of a rod 39, is pivotally mounted in bracket-like supports 40 and 41 that are affixed by suitable conventional means to the dividing wall member 11. One end of said control rod is provided with an indicator-like manually operable control knob 42, while the opposite end portion of the rod, preferably, is bent outwardly and downwardly to fashion an offset crank element 43 thereon. Said crank element, upon rotation of the rod 39, is adapted to engage a clip-like bracket 44 secured by suitable fastening means to the damper or closure panel 37. The clip 44 may be fashioned with a resilient member 45, having a portion thereof spaced from the adjoining damper panel 37 to provide a recess-like pocket or groove 46 for cooperatively receiving the crank element 43 and further having the end of said resilient member outwardly curved as shown at 47 to facilitate engagement thereof with said crank element. An additional resilient member, in the form of a leaf-spring 48 suitably secured to the damper 37, may be disposed so as to extend through the recess 46 and resiliently engage the crank element 43, upon entrance of said crank into said recess, thereby fixedly positioning said crank between the resilient member 45, of the clip 44, and said leaf-spring so as to reduce the possibility of rattling and to aid in the dampening of other objectionable vibratory disturbances that may be set up in the unit.

A crank arm or link member 49 is securedly affixed proximate one of its ends to the control rod 39 and is adapted to rotate with said rod. The opposite end of said crank arm or link has one end of a traverse rod 50 pivotally connected thereto while the opposite end of said traverse rod is slidably mounted in a longitudinally extending slotted opening 51 disposed proximate one end of a bell crank lever 52. Said bell crank is pivotally mounted for rotation on a supporting pedestal-like bracket 52a, which, in turn, is fixedly mounted on the dividing wall 11. One end of a second traverse or pull rod 53 is pivotally mounted in the free end of said bell crank and secured thereto by suitable removable means such as the conventional clevis clip 54, while the opposite end of said latter traverse or pull rod is similarly mounted and retained by a clevis clip 55 in an angled bracket 56 which, in turn, is affixed to the exhaust damper panel 33.

An angled bracket 57, which is affixed to the ventilation damper panel 37 proximate the lower edge thereof, has one end of a deformed traverse or pull rod 58 pivotally mounted therein and removably secured thereto by suitable means such as the standard clevis clip 59, while the opposite end of said deformed pull rod is similarly mounted and retained by a clevis clip 60 in an angled bracket 61 which, in turn, is fixedly secured to the recirculation damper panel 30.

A resilient member, preferably in the form of a flat leaf spring 62, is positioned so that its opposite ends, respectively, abut bracket-like supports 63 and 64 upstanding along opposite edges of the bracket 41, while the central section of the spring frictionally engages a reduced section 65 of the control rod 39. A plurality of flat spots, such as shown at 66, 66a and 66b (Fig. 10), on said control rod are disposed to engage said spring upon rotation of the rod 39, and may, together with said spring, provide means for indexing the different positions thereof as it rotates to operate the dampers.

During the normal cooling operation, air from the room being cooled is continuously recirculated and during the course of such circulation the air is passed through the unit so that heat picked up from the room may be removed before said air flows back again into the room. During this recirculation or cooling cycle the circulation damper 30 is open and the inlet 28 is unrestricted to the flow of air from the room, while the openings 32 and 35 are restricted to the passage of air therethrough by the dampers 33 and 37, respectively, which are closed. In this position, as best illustrated in Fig. 2, control rod 39 is in what may be termed a first or neutral position. With said rod thus disposed the crank element 43 stands in the pocket 46 and is snugly positioned between the resilient members 45 and 48 while the crank arm 49, which is fixedly displaced 45° counterclockwise from the crank element 43, is rotated to a position such that the end of the traverse rod 50 rests at one end of the slotted opening 51, in the bell crank 52, and the spring-biased hinges 34 are unopposed in their effort to retain the damper 33 in a closed position. In this first or neutral position the room air is free to pass by way of the elongated inlet opening 28 through the filter 16 to evaporator 15, where it is cooled, and into the blower fan 18 from whence it is discharged by way of chamber 26 through the louvered outlet openings 31 back into the room at a lower temperature.

During the second or ventilating cycle fresh or make-up air is admitted to the unit and recirculation of room air through the unit is substantially restricted. In this second or ventilating position, which is best illustrated in Fig. 1, the control rod 39 has been rotated counterclockwise and during such rotation element 43 although still positioned in the pocket or recess 46 has been pivoted so as to simultaneously engage the stop wall 68, at one end of the clip bracket 44, and to exert an outward force against the resilient member 45, thus causing damper 37 to open against the restraining influence of its spring-biased hinges 38. As this latter damper is opened the damper 30, which operates conjointly therewith because of the interconnecting traverse rod 58, is closed and fresh air is admitted into the inner cabinet through the vestibule-like compartment 36. Since the damper 30 is now closed and the opening 28 almost completely restricted fresh air admitted through opening 35 passes through the filter element 16 and into the evaporator 15, as before, and is subsequently discharged by way of the louvered outlet opening 31 into the room. As the control rod 39 is rotated into this ventilating position the crank arm 49 mounted thereon is also rotated, and the slidable end of the traverse rod 50 is caused to slide back and forth in the slotted opening 51, in the bell crank 52, without disturbing exhaust damper 33 which is retained in its closed position by its spring-biased hinges 34. In this manner fresh air may be admitted and passed through the unit and into the room without being accidentally by-passed into the exhaust opening and back in the atmosphere.

During the third or evacuation cycle stale air is exhausted or evacuated from the room into the outer cabinet by way of the exhaust opening 32. In this third or exhaust position, which is best illustrated in Fig. 3, the control rod 39 has been rotated clockwise a distance sufficient to remove the crank element 43 from the recess 46, thus allowing the damper 37 to be maintained closed by the action of its spring-biased hinges 38. As the control rod 39 is thus rotated it carries with it the crank arm 49 which actuates the traverse rod 50 and causes the slidable end of said latter rod to engage the track of the slotted opening 51, in the bell crank 52, and thereby rotate said bell crank which, through the interconnecting traverse rod 53 and angle bracket 56, then rotates the damper 33 against the reaction of its spring-biased hinges 34 and opens the inlet 32 into the outer cabinet. Now as the recirculated room air is discharged from the blower fan 18 into the discharge chamber 26 a substantial portion thereof will impinge against the baffle-like outwardly extending damper 33 and be deflected into the opening 32 and into the outer cabinet where it will subsequently be discharged by the condenser fan 22 into the outside atmosphere. In this manner evacuation or exhaustion of stale air from the room may be accomplished without interfering with the position of the closed fresh air or ventilating damper 37. Likewise, the damper 30 is arranged to remain in an opened position during the exhaust or evacuation operation, hence the flow of air from the room into the unit is not restricted during the particular exhaust cycle.

Although only a preferred form of the invention has been illustrated, and that form described in detail, it will be apparent to those skilled in the art that various modifications may be made therein without departing from the spirit of the invention or from the scope of the appended claims.

We claim:

1. A room air conditioning unit, comprising: a cooling element; means providing flow of a stream of air from the room in to the unit, in contact with said cooling element, and then from the unit into the room; the unit having an air inlet for admitting air from outdoors to said air stream, an outlet for exhausting air from said stream, and an inlet for admitting air from the room; first, second and third dampers actuated to closed position by spring biased hinges, and controlling the said outdoor air inlet, the said exhaust outlet, and the said room air inlet, respectively; said first and second dampers being biased to closed position and said third damper to open position; means operatively connecting said third damper to said second damper for conjoint movement therewith; means for actuating said first and second dampers including, a crank member having a portion thereon which upon rotation of the crank in one direction engages said second damper in an operative relationship, and motion-transmitting linkage operatively connecting said first damper to said crank member; said actuating means being fashioned and arranged so as to permit said crank to be rotated in one direction to engage and open said second damper without opening said first damper, and to be rotated in an opposite direction to open said first damper and simultaneously effect the disengagement of said portion of said crank from its operating relationship with said second damper so as to permit said latter damper to return to a biased closed position conjointly with the opening of said third damper.

2. In a room air conditioning unit, the combination, comprising: an outer cabinet defining an apparatus compartment, an inner cabinet defining a cooling compartment, and a partition between said compartments; said cooling compartment having an air inlet and an air outlet communicating with a room to be cooled; said partition having a first opening therein communicating with both of said compartments for exhausting air from the room, and a second opening therein connecting the cooling compartment with the outside atmosphere for admitting fresh air to the room; first, second, and third damper members pivotally mounted over the said first partition opening, said second partition opening, and said cooling compartment air inlet, respectively; a rotatable member having an offset portion extending from one end thereof; resilient means mounted on said second damper for engageably cooperating with said offset portion to open said second damper upon rotation of said rotatable member in one direction, and to aid in the closure of said second damper when said rotatable member is rotated in the opposite direction; motion-transmitting mechanism operatively connecting said rotatable member with said first damper and effective for opening said first damper when said rotatable member is rotated in one direction, and for closing said first damper when said rotatable member is rotated in the opposite direction; means connecting said second damper to said third damper and arranged so that when said second damper is open said third damper is closed and contrawise.

3. In a room air conditioning unit, the combination, comprising: an outer cabinet defining an apparatus compartment, an inner cabinet defining a cooling compartment, and a partition between said compartments; said cooling compartment having an air inlet and an air outlet communicating with a room to be cooled; said partition having a first opening therein communicating with both of said compartments for exhausting air from the room, and a second opening therein connecting the cooling compartment with the outside atmosphere for admitting fresh air to the room; first, second, and third damper members pivotally mounted over the said first partition opening, said second partition opening, and said cooling compartment air inlet, respectively, and having said first and second dampers biased to closed positions; means operatively connecting said third damper to said second damper for conjoint movement therewith; a rotatable member cooperatively engageable with said second damper upon rotation of said rotatable member in one direction for opening said latter damper; motion-transmitting mechanism operatively connecting said rotatable member with said first damper and effective for opening said first damper when said rotatable member is rotated in one direction and for closing said damper when said member is rotated in the opposite direction; said mechanism including, an arm, a traverse rod, a crank having a longitudinally extending slotted opening in one end thereof, and a pull rod all connected in series; and having one end of said arm fixedly conected to said rotatable member for rotation therewith, and one end of said pull rod pivotally connected to said first damper for movement therewith, and having said traverse rod arranged so that one end thereof is disposed in said slotted opening of said crank and adapted to slide therein without rotating said crank when said rotatable member is rotated in one direction but effective for rotating said crank and for opening the first damper when said rotatable member is rotated in the opposite direction.

4. An air conditioning unit, comprising: an outer cabinet defining an apparatus compartment, an inner cabinet defining a cooling compartment, and a partition between said compartments; said cooling compartment having an inlet and an outlet communicating with a room to be cooled; said partition having an opening communicating with both of said compartments, and an additional opening through which the cooling compartment is connected with the outside atmosphere; first, second, and third damper means actuated to closed position by spring biased hinges, and disposed, respectively, to cover the opening in the partition between the compartments, the opening from the outside atmosphere to the cooling compartment, and the inlet from the room to be cooled; said first and second dampers being biased to closed position; means connecting said second damper to said third damper for conjoint operation therewith; means for operating said dampers including, a crank member which upon rotation in one direction operatively engages and opens said second damper together with the conjoint closing of said third damper, and motion-transmitting linkage connecting said first damper to said crank member with said linkage so arranged as to permit said crank to be rotated in one direction to open said second damper without opening said first damper; said crank member being rotatable in an opposite direction to open said first damper and be simultaneously disengaged from operative relationship with said second damper so as to permit the return of said second damper to a biased closed position conjointly with the opening of said third damper.

5. In a self-contained air cooler adapted to be mounted in the window of a room to be cooled, the combination, comprising: a casing structure formed to provide an inner cooling compartment and an outer apparatus compartment and having a partition therebetween; the cooling compartment having an air inlet and an air outlet communicating with the room; said partition having a first opening therein communicating with both of the said compartments for exhausting air from the room, and a second opening therein connecting the cooling compartment with outside atmosphere for admitting fresh air to the room; first, second and third dampers pivotally disposed adjacent said first partition opening said second partition opening and said cooling compartment air inlet, respectively; said first and second dampers being biased to a closed position; means connecting said second damper to said third damper and arranged so that when one of said two dampers is open the other one is closed; means for operating said dampers including, a rotatable member having a crank on one end thereof, a clip member secured to said second damper and having a resilient portion thereof spaced from the damper to provide a pocket-like recess adapted to engageably receive and co-operate with said crank upon rotation of said rotatable member in one direction for effecting the opening of said second damper, and lost-motion linkage connecting said first damper to said crank member and arranged so as to permit said crank to be rotated in one direction for opening said second damper without opening said first damper and to be rotated in the opposite direction for opening said first damper for simultaneous disengagement from the clip member of said second damper as said latter damper returns to a biased closed position.

6. In a self-contained air cooler adapted to be mounted in the window of a room to be cooled, the combination, comprising: a casing structure formed to provide an inner cooling compartment and an outer apparatus compartment and having a partition therebetween; the cooling compartment having an air inlet and an air outlet communicating with the room; said partition having a first opening therein communicating with both of the compartments for exhausting air from the room, and a second opening therein connecting the cooling compartment with outside atmosphere for admitting fresh air to the room; first, second and third dampers being pivotally disposed adjacent said first partition opening said second partition opening and said cooling compartment air inlet, respectively; said first and second dampers being biased to a closed position; means connecting said second damper to said third damper and arranged so that when one of said two latter dampers is open the other one is closed; means for actuating said dampers including, a rotatable member having a crank on one end thereof, a clip member secured to said second damper and having a resilient portion thereof spaced from the damper to provide a pocket-like recess to engageably receive and cooperate with said crank upon rotation of said rotatable member in one direction for effecting the opening of said second damper, and motion-transmitting mechanism connecting said rotatable member with said first damper; said motion-transmitting mechanism including, an arm, a traverse rod, a bell crank having a longitudinally extending slotted opening proximate one end thereof and a pull rod all connected in series, and having one end of said arm fixedly connected to said rotatable member for rotation therewith, and said pull rod having one end thereof pivotally connected to said first damper for movement therewith; said traverse rod having one end thereof slidably disposed in the slotted opening of said bell crank and being adapted to slide therealong without actuating the bell crank when said rotatable member is rotated in one direction but being effective for actuating said bell crank and for opening said first damper when said rotatable member is rotated in the opposite direction.

References Cited in the file of this patent
UNITED STATES PATENTS

| | | |
|---|---|---|
| 2,290,973 | Jewell | July 28, 1942 |
| 2,408,972 | Eberhart | Oct. 8, 1946 |